United States Patent
Wang et al.

(10) Patent No.: US 10,085,415 B1
(45) Date of Patent: Oct. 2, 2018

(54) CAT ATTRACTANT

(71) Applicant: Kent Pet Group, Inc., Muscatine, IA (US)

(72) Inventors: Lin Wang, Iowa City, IA (US); Elizabeth Flickinger, Muscatine, IA (US); Michael Eversmeyer, Muscatine, IA (US)

(73) Assignee: Kent Pet Group, Inc., Muscatine, IA (US)

( * ) Notice: Subject to any disclaimer, the term of this patent is extended or adjusted under 35 U.S.C. 154(b) by 0 days.

(21) Appl. No.: 15/901,590

(22) Filed: Feb. 21, 2018

Related U.S. Application Data

(60) Provisional application No. 62/510,457, filed on May 24, 2017.

(51) Int. Cl.
*A01K 1/01* (2006.01)
*A01K 1/015* (2006.01)

(52) U.S. Cl.
CPC .......... *A01K 1/0155* (2013.01); *A01K 1/0154* (2013.01)

(58) Field of Classification Search
CPC ... A01K 1/0152; A01K 1/0155; A01K 1/0154
USPC .................................. 119/171–174
See application file for complete search history.

(56) References Cited

U.S. PATENT DOCUMENTS

| | | | |
|---|---|---|---|
| 3,789,797 A | 2/1974 | Brewer | |
| 4,263,873 A | 4/1981 | Christianson | |
| 4,296,709 A | 10/1981 | Schulein, Jr. | |
| 5,054,434 A | 10/1991 | Wax et al. | |
| 5,058,533 A | 10/1991 | Nelson | |
| 5,287,826 A | 2/1994 | Mohamed | |
| 5,526,770 A * | 6/1996 | Kiebke | A01K 1/0152 119/171 |
| 6,287,550 B1 | 9/2001 | Trinh et al. | |
| 8,091,508 B2 | 1/2012 | LaPlant et al. | |
| 8,124,156 B2 * | 2/2012 | Axelrod | A23K 50/40 119/709 |
| 8,505,487 B2 | 8/2013 | Hoxworth | |
| 2003/0205204 A1 | 11/2003 | Wang et al. | |
| 2004/0037792 A1 | 2/2004 | Hiramoto et al. | |
| 2005/0279290 A1 * | 12/2005 | Hyland | E01H 1/1213 119/867 |
| 2012/0288468 A1 | 11/2012 | Wang et al. | |

(Continued)

FOREIGN PATENT DOCUMENTS

| | | |
|---|---|---|
| CA | 2042597 A1 | 4/1991 |
| EP | 0450087 A1 | 10/1991 |
| EP | 0509997 A4 | 9/1993 |

(Continued)

OTHER PUBLICATIONS

International Search Report and Written Opinion for PCT/2018/019409 dated Jun. 4, 2018.

*Primary Examiner* — Yvonne R Abbott-Lewis
(74) *Attorney, Agent, or Firm* — Fitch, Even, Tabin & Flannery LLP

(57) ABSTRACT

Disclosed is a cat attractant that comprises alfalfa meal and a plant fiber having an acidic pH, such as cranberry fiber. It has been found that the cat attractant can be used to render a cat litter box more attractive to cats, and, it is believed, to thereby mitigate litter aversion syndrome. Also disclosed are an animal litter, a method of preparing an animal litter, and a method of using the cat attractant.

12 Claims, 3 Drawing Sheets

(56) References Cited

U.S. PATENT DOCUMENTS

2017/0035021 A1  2/2017  Wang et al.

FOREIGN PATENT DOCUMENTS

| WO | 9946983 A1 | 9/1999 |
| WO | 2017048925 A1 | 3/2017 |

\* cited by examiner

CAT ATTRACTANT

TECHNICAL FIELD

The disclosure generally is in the field of pet care and more specifically related to animal litters, especially cat litters.

BACKGROUND

Cats normally exhibit certain behaviors when eliminating waste. These behaviors begin with a search for a suitable material upon which to urinate or defecate. Once the cat selects the appropriate material, the cat will attend to dig a shallow depression. After elimination, many cats with dig again to attempt to cover up the waste.

Indoor cats are expected to use litter boxes for this purpose. A litter box generally comprising an open vessel containing a quantity of animal litter. Many animal litters are known in the art, these including litters having both organic sorbents and inorganic sorbents, and having the form of non-clumping and clumping animal litters.

Some cats, unfortunately, do not reliably use the litter box. Inappropriate elimination is a leading cause of cat relinquishment to shelters. Outside of spraying, two main drivers of inappropriate elimination are medical issues and behavioral issues. Among behavioral issues, litter aversion and litter preference are the main drivers. Litter aversion syndrome is a behavioral issue where cats will display one or more of several undesirable behaviors, such as depositing waste outside of the litter box, shaking paws after existing the litter box, standing on the edge of the litter box, running away from the litter box, or crying when near the litter box. The acceptability of the litter can be affected by the odor and the texture of the litter. Both heavily perfumed litters and litters with accumulated waste product can be repelling to cats, with ammonia, in particular, contributing to the offensive order emitted by litter boxes. In the past, there have been efforts to add materials to cat litter to increase the attractiveness of the litter to the cat. For example, catnip and certain other plants emit nepetalactone, an oil that creates an arousal response in cats. Nepetalactone, however, does not appear to assist with desired elimination behavior, and may encourage additional unsuitable behaviors.

It would therefore be desirable to provide a litter that is attractive to cats, and an attractant to increase the appeal of known litters.

SUMMARY

It has not been found that a cat attractant may be prepared from alfalfa meal and a plant fiber having an acidic pH, such as cranberry fiber. Surprisingly, it has been found that a cat attractant prepared using alfalfa meal and cranberry fiber exhibits a better cat attractant property than either of these ingredients used alone. In some embodiments, the invention provides a cat attractant. In other embodiments, the invention provides a cat or other animal litter, the cat litter comprising a sorbent material and a cat attractant, the cat attractant including alfalfa meal and a plant fiber having an acidic pH. A method of using the cat attractant and a method of using the animal litter are also encompassed in various embodiments of the invention. The method of using the cat attractant comprises adding the attractant to the litter in an amount effective to relatively increase the attractiveness of the litter to cats.

Also encompassed in some embodiments are a method of preparing an animal litter and a method of removing animal waste. The method of preparing animal litter generally comprises formulating a litter using a cat attractant as provided herein. The method for removal of animal waste generally comprises allowing an animal to excrete waste into a litter that has been formulated with the cat attractant components, or to which cat attractant has been added, and removing waste from the litter.

DETAILED DESCRIPTION

Figure 1:
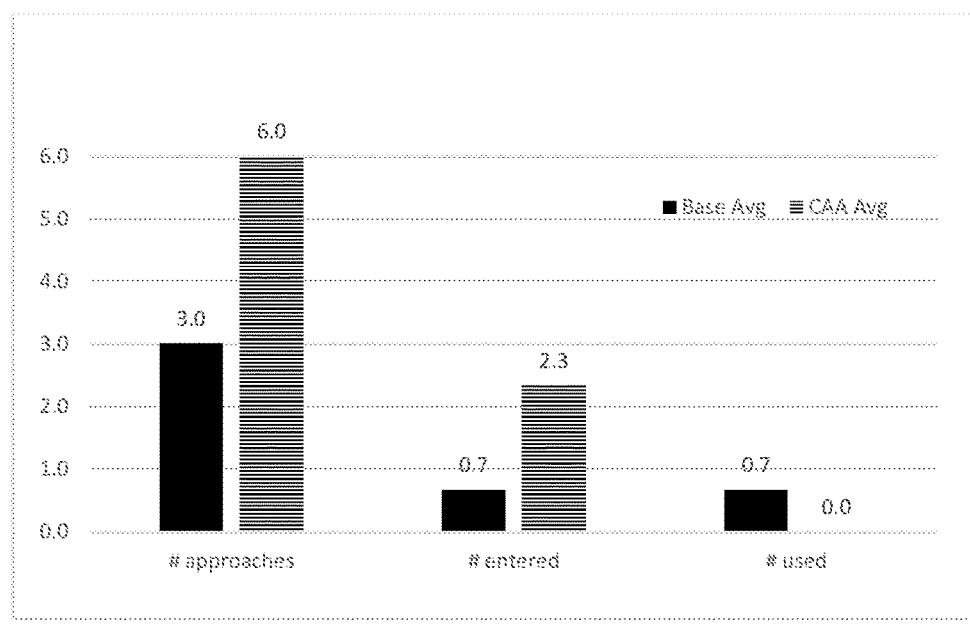
FIGS. 1-5 include data from a number of the Examples herein below.

The litters described herein may be based on any inorganic or organic litter formulation, and such litters may be formulated with the cat attractant or the cat attractant may be added to the litter after it is produced, such as during packaging or in the home by the cat owner. Desirable properties of the litter, not necessarily all present in all embodiments of the present invention, include the following:

Plant-based ingredients

An attracting scent without causing inappropriate behaviors as would catnip (rolling, eating).

Ability to be added to the litter prior to a compacting and granulating and remain effective, while attaining advantages of consistent mixing.

Sand-like texture, which is instinctive for cats to dig and bury waste.

Moderate density to inhibit litter tracking and sticking to fur.

Clumping property that, when wetted in a litterbox, forms compact, rounded clump shape that may be readily removed.

Quick absorption of urine

Minimal dusting (<1% w/w)

The litter may be a clumping animal litter. Clumping animal litters are typically provided in the form of discrete plural particles. The particles tend to agglomerate into solid masses or clumps when wetted by a liquid waste such as animal urine. A number of such clumping litters are known. One advantage of such clumping litters is that the solid clumps, which are formed upon wetting of the litter, can be separately removed as discrete entities from the remaining litter. The clumped litter can be discarded by the animal owner, leaving behind a quantity of relatively uncontaminated litter for future use. Animal owners, particularly owners of house cats, often find the clumping property of such litters to be convenient for periodic cleaning of the animal litter box. Ammonia-masking properties also are desirable in animal litters because ammonia, a breakdown product of the urea found in animal urine, is a significant factor that contributes to the undesirable odor of animal waste. Some known animal litters have good ammonia-masking properties.

Many clumping animal litters are made from clays and other mineral substrates. Such litters typically include particles of a mineral substrate, which substrate functions as an absorbent and/or odor reducer. The particles may be coated with a liquid-activated adhesive material, such as gelatinized starch, on the surfaces of the particles. When wetted, the adhesive material is activated and causes the discrete litter particles to agglomerate into clumps.

Although clay-based litters may be functional as clumping animal litters, such litters may have different features and characteristics compared to other materials. For example, one feature of clay litters is the high density of the clay component of the litter. Because of this high density, a relatively heavy mass of litter must be used for a given volume of urine. In addition, the resulting clumps of soiled litter are somewhat heavy, and thus can fracture in the absence of strong particle adhesion. Another feature of clay litters is that, because the clay is not biodegradable, the litter cannot be flushed into some sewage systems after use. This may be inconvenient for certain animal owners.

In recognition of these features, animal litters made from biodegradable materials, such as seed hulls or other grain-based materials, have been provided. Such litters are often suitable for disposal by flushing into sewage systems Numerous clumping animal litters are known in the art, exemplary such litters being described, for example, in U.S. Pat. Nos. 6,098,569; 6,216,634; 6,405,677; 6,622,658; 6,868,802; 7,753,002; 7,757,638; 8,734,768; 9,232,765; 9,232,767; 9,288,964; 9,363,977; 9,414,566; 9,433,187; 9,497,927; and 9,668,453. Each of these patents is incorporated by reference in its entirety for its disclosure of a litter formulation that is suitable for use with the technology described in the present application.

Generally, a cat attractant prepared in accordance with the present teachings comprises alfalfa meal and a plant fiber. The plant fiber may be any suitable plant fiber that is acidic, and may include, for instance, apples, blueberries, cherries, cranberries, grapes, lemons, limes, oranges, peaches, pineapples, plums, or strawberries, or blends of the above. The alfalfa meal and the plant fiber may be present in any suitable amount relative to one another; for example, the alfalfa meal may be present in an amount of 1%, 2%, 3%, 4%, 5%, 6%, 7%, 8%, 9%, 10%, 15%, 20%, 25%, 30% 40%, 50%, 60%, 70%, 80%, or 90% by dry basis weight of the total amount of alfalfa and plant fiber. The animal litter may consist essentially of the alfalfa meal and the plant fiber or, in some embodiments, other ingredients, such as preservatives, fragrances, or other components may be provided. When used, the other components may be present in any amount intended for their effective purpose.

Generally, cat attractant is used by adding the cat attractant, as a dry blend, to an animal litter box. The cat attractant may be added to the box at any suitable ratio relative to the amount of litter in the box. In practice, it is believed that the cat attractant should be added to the box in an amount of 0.25-1.0 grams per square inch, based on the size of the litter box as opposed to the amount of the litter in the box. This may be independent of the depth of the litter in the box. Generally, the cat attractant may be added to the litter in any amount effective to increase the attractiveness of the litter to a cat (or, in the case of a different type of litter, to the intended animal) relative to the state of the litter prior to addition of the cat attractant. Addition of the cat attractant in the heretofore specified amount is believed to satisfy this requirement. Subsequently, the cat (or other animal of interest) may be allowed to eliminate waste into the box, and the box may be cleaned, such as by removal of any clump and solid animal waste.

In addition, an animal litter may be formulated using alfalfa meal and a plant fiber. It is believed that an animal litter so formed will be relatively more attractive to cats than will be a comparable litter formed in the absence of the cat attractant. The litter may include alfalfa meal and plant fiber in any suitable amount relative to one another, as heretofore described. The total combined amount of alfalfa meal and cranberry fiber may range from 1 to 5%, for instance, by total dry weight of the animal litter, an amount which is believed to satisfy the above criteria.

In one aspect, the invention provides a method of preparing an animal litter, the method generally comprising blending a sorbent material, alfalfa meal, and a plant fiber as described here above.

The following examples are provided for illustration and are not intended to be limiting.

Example 1

The cat attractant mixtures identified below were made from an alfalfa meal and cranberry fiber. To test the acidity of the resulting blends, 5 grams of the mixture were mixed into 100 ml of water, and the pH of those slurries recorded.

TABLE 1

Examples of cat attracting mixture and pH of their water slurries.

| Cat Attracting | pH of their water slurries |
|---|---|
| "AlfaGreen" Alfalfa Meal (Control) | 6.06 |
| "AlfaGreen" Alfalfa Meal/Cranberry Fiber 80/20 mix | 5.36 |
| "AlfaGreen" Alfalfa Meal/Cranberry Fiber 75/25 mix | 5.16 |

Example 2

An animal litter was prepared by mixing the following ingredients and pelletizing using a pellet mill equipped with 5/32 inch diameter holes at a temperature of around 155° F.

| Ingredient | % Total Weight |
|---|---|
| Ground corn | 30.9 |
| Defatted corn germ | 25.0 |
| Citrus | 25.0 |
| Corn starch | 8.0 |
| Finely ground corn cobs | 4.0 |
| Salt | 3.0 |
| Alfalfa meal | 1.75 |
| Ground virgin corn germ | 1.0 |
| Citric acid | 1.0 |
| Fruit residue** | 0.25 |
| Potassium sorbate | 0.1 |

**Selected from apples, blueberries, cherries, cranberries, grapes, lemons, limes, oranges, peaches, pineapples, plums, and strawberries.

Example 3

A cat attractant was added to commercial World's Best Cat Litter products, available from Kent Pet Group of Muscatine, Iowa. A two-box test was employed with three rooms of group-housed cats. All cats at the facility routinely used commercially available formulas of WBCL. Two World's Best Cat Litter products, Multiple Cat Formula (CE) and Clumping Formula (CL) were placed with two clean uncovered litter boxes filled with ~5 lbs. (2-3") of WBCL (1 control, 1 test). Boxes were placed at least 24 inches apart. Cats were observed through the window for 15 minutes. The number of approaches, number entering box, number using box, and time of each event were recorded. "Time spent near box" is defined as starting with the approach time stamp and ending either when the cat leaves the area or enters the box. The results are illustrated in FIG. 1. As seen, the cat attractant sprinkled directly on top of the litter increased number of litter box approaches and entrances. No effect was observed for actual usage, which may be attributed to the short duration of the observation period.

Example 4

Figure 2:
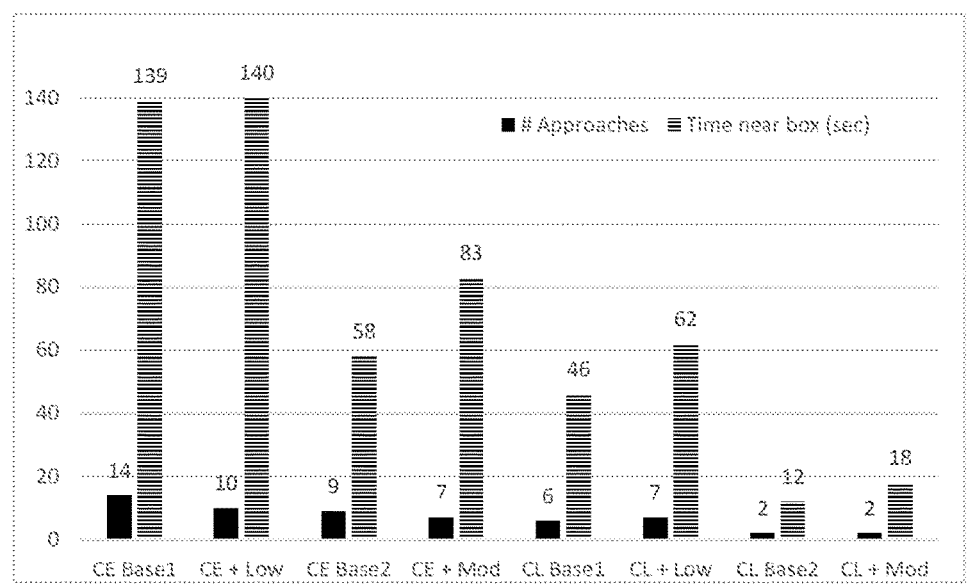

In the same test setup, a cat attracting mixture was added to World's Best Cat Litter products. Again two World's Best Cat Litter products, Multiple Cat Formula (CE) and Clumping Formula (CL) were tested and blended in various ratios. Test results (FIG. 2) suggested that in the CE product, the cat attractant begins to be effective at the moderate inclusion rate as evidenced by an average of 43% more time spent near the box (83 vs. 58 seconds). In the CL product, an average of 35% more time near the box was observed at the low inclusion rate (62 vs. 46 seconds), and was only modestly increased at the moderate level (18 vs. 12 seconds, 50% more time).

The following formulations were evaluated:

CE Base 1 and 2=World's Best Cat Litter Multiple Cat Formula.

CE+Low=World's Best Cat Litter Multiple Cat Formula+low inclusion rate.

CE+Mod=World's Best Cat Litter Multiple Cat Formula+moderate inclusion rate.

CL Base 1 and 2=World's Best Cat Litter Clumping Formula.

CL+Low=World's Best Cat Litter Clumping Formula+low inclusion rate.

CL+Mod=World's Best Cat Litter Clumping Formula+moderate inclusion rate.

Example 5

Figure 3:
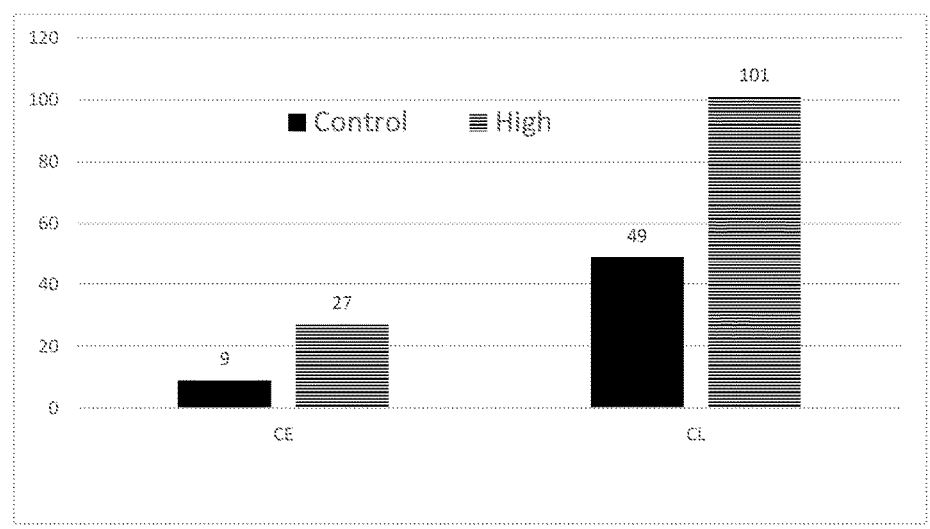

In the same test setup, a cat attracting mixture was added to World's Best Cat Litter products. Again two World's Best Cat Litter products (Multiple Cat Formula (CE) and Clumping Formula (CL) were tested. Cats were given two pans of litter (test and control) for 48 hours prior to being observed. Boxes were scooped daily and immediately prior to observations for ~15 minutes. The results of this protocol (FIG. 3) show a similar trend as the shorter protocol. A high inclusion rates of the additive was tested, which substantially increased time spent near the box, regardless of the base litter (CE or CL).

Example 6

A cat attracting mixture is added to a commercial clay-based cat litter.

Example 7

An animal litter was prepared by mixing the following ingredients and pelletizing using a pellet mill equipped with 5/32 inch diameter holes at a temperature of around 155° F.

| Ingredient | % Total Weight |
| --- | --- |
| Finely ground corn cob | 49.9 |
| Corn starch | 18.0 |

-continued

| Ingredient | % Total Weight |
| --- | --- |
| Ground corn | 16.0 |
| Defatted corn germ | 6.0 |
| Ground virgin corn germ | 4.0 |
| Salt | 3.0 |
| Alfalfa meal | 1.5 |
| Citric acid | 1.0 |
| Fruit residue** | 0.5 |
| Potassium sorbate | 0.1 |

**Selected from apples, blueberries, cherries, cranberries, grapes, lemons, limes, oranges, peaches, pineapples, plums, and strawberries.

Example 8

The following litter formulations (test and control) were prepared and evaluated.

| | Inclusion (wt %) | | |
| --- | --- | --- | --- |
| Ingredient | Litter of Example 2 | Control (Alfalfa meal only) | Control (Cranberry fiber only) |
| Ground corn | 30.9 | 31.1 | 32.7 |
| Defatted corn germ | 25.0 | 25.0 | 25.0 |
| Citrus | 25.0 | 25.0 | 25.0 |
| Corn starch | 8.0 | 8.0 | 8.0 |
| Finely ground corn cobs | 4.0 | 4.0 | 4.0 |
| Salt | 3.0 | 3.0 | 3.0 |
| Alfalfa meal | 1.75 | 1.8 | 0 |
| Ground virgin corn germ | 1.0 | 1.0 | 1.0 |
| Citric acid | 1.0 | 1.0 | 1.0 |
| Fruit residue** | 0.25 | 0 | 0.2 |
| Potassium sorbate | 0.1 | 0.1 | 0.1 |

To formulate the litter in each case, the ingredients were mixed together and then pelletized in a pellet mill with a 5/32-inch diameter holes at a temperature between 150-160° F. The product was dried to <12% moisture prior to crumbling to increase surface area.

To evaluate these litter formulas with cats, a two-box test was employed with three rooms of group-housed cats. All cats at the facility routinely used commercially available formulas of World's Best Cat Litter. Briefly, cats (n=7) were given 2 clean pans of litter (test and control), each containing 2-3 inches of litter. Each room received each test combination over a two-week period of time. Boxes were placed least 24 inches apart, and cats had access to the boxes and litter formulas for 48 hours prior to being observed. Boxes were scooped daily and immediately prior to observation through the window for ~10 minutes.

Figure 4:
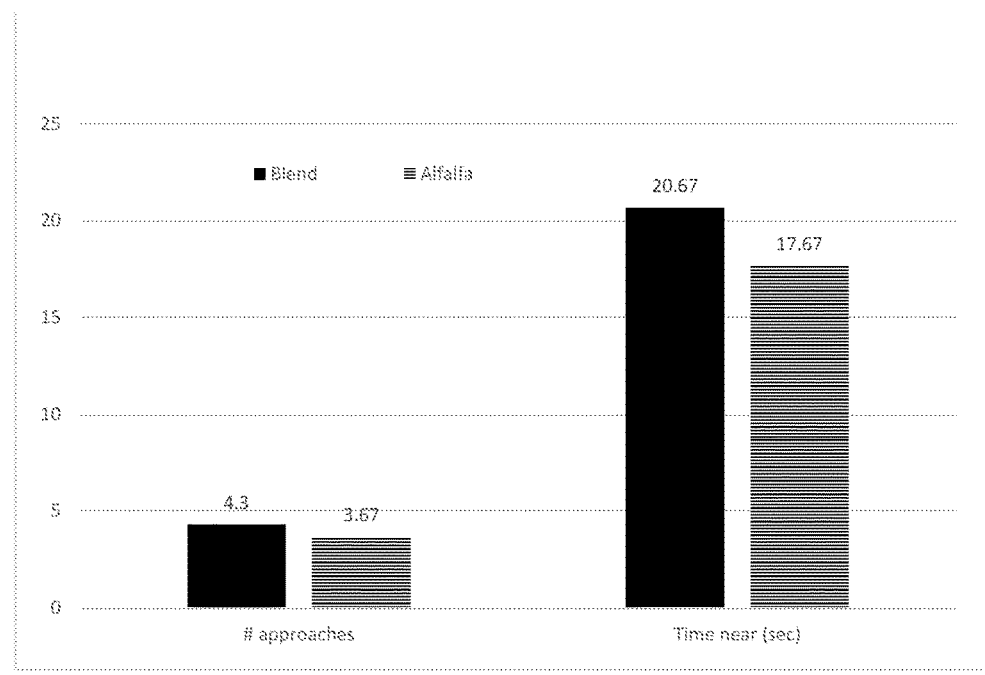
Figure 5:
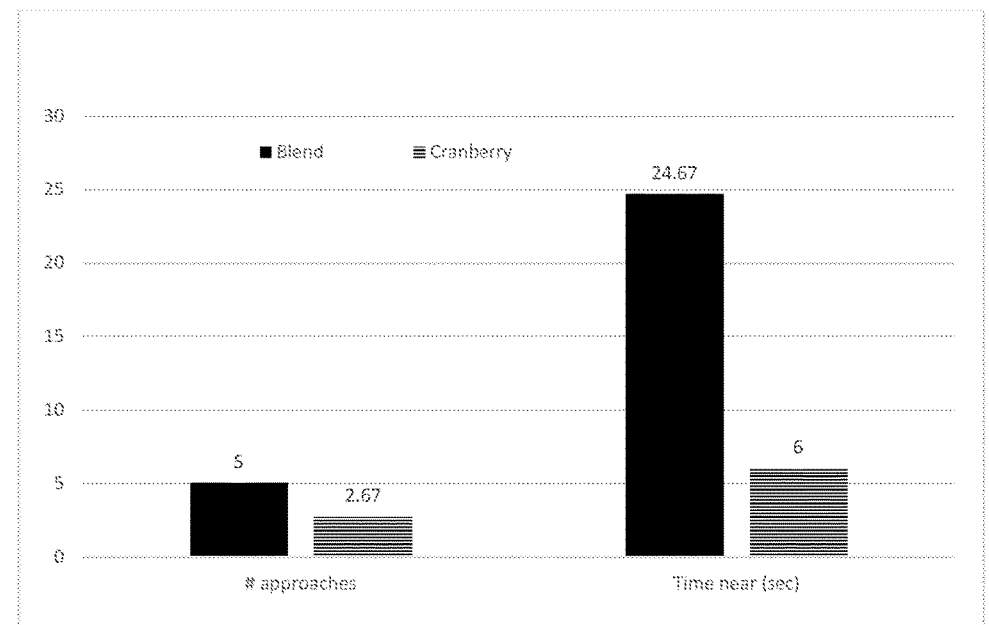

The results of this test are depicted in FIGS. 4 and 5. As seen, the litter formulated with both alfalfa and cranberry fiber performed better than litter formulated with either alfalfa or cranberry alone. This trend was true both for time spent near the box (primary outcome) and number of times the litter box was approached (secondary measure). The difference was particularly striking when comparing the cranberry ingredient vs. the blend.

It is thus seen that a cat attractant may be provided. From the above, it is seen that a container including a litter of the invention may be provided, and an animal may be allowed to excrete waste into the litter, whereby liquid present in the waste causes agglomeration of at least some of the litter into at least one clump in the case of a clumping litter. The clump then may be from the container. The litter is useful in conjunction with removal of waste from house cats, and also in conjunction with removal of waste from other animals, such as other mammals (e.g. rodents) and birds. It will be appreciated that the animal litter can be prepared from the cat attractant, or the cat attractant can be separately prepared and blended with discrete particles of a previously prepared animal litter and that blend placed in the container (such as a litter box); or the additive can be separately prepared and added to an existing litter.

All references cited herein are hereby incorporated by reference in their entireties. All weight percentages are on a dry solids basis unless stated otherwise or clearly contraindicated by context.

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A cat attractant comprising a mixture of alfalfa meal and an acidic plant fiber, the alfalfa meal being present in an amount of at least 60% by weight.

2. The cat attractant of claim 1, consisting essentially of alfalfa meal and cranberry fiber.

3. An animal litter comprising discrete plural particles of a sorbent material and a cat attractant, the cat attractant comprising a mixture of alfalfa meal and an acidic plant fiber, the alfalfa meal being present in an amount of at least 60% by weight relative to the weight of the acidic plant fiber.

4. The animal litter of claim 3, the acidic animal fiber comprising cranberry fiber.

5. The animal litter of claim 3, comprising ground corn, defatted corn germ, citrus fiber, a lubricant, and a cohesiveness agent, the animal litter being in the form of discrete plural compacted particles which attend to agglomerate when wetted, said cohesiveness agent being present in said litter in an amount effected to enhance the intraparticle cohesion of said particles.

6. The animal litter of claim 3, said sorbent comprising at least 10% finely ground wood powder, said wood powder functioning as a sorbent in said litter, a lubricant, and a cohesiveness agent, the animal litter being in the form of discrete plural particles which tend to agglomerate when wetted, the cohesiveness agent being present in an amount effective to enhance the intra particle cohesion of the particles.

7. The animal litter of claim 6, wherein about 55% to about 75% of the discrete plural compacted particles are larger than U.S. standard #14 mesh screen size, about 10% to about 20% of the discrete plural compacted particles are larger than U.S. standard #20 mesh screen size, no more than about 6% of the discrete plural compacted particles are larger than U.S. standard #30 mesh screen size, no more than 3% of the discrete plural compacted particles are larger than U.S. standard #40 mesh screen size, and no more than 2% of the discrete plural compacted particles are larger than U.S. standard #80 mesh screen size.

8. An animal litter according to claim 3, said sorbent comprising at least about 30 weight % ground corn cob, a lubricant, and a cohesiveness agent, wherein the animal litter is in the form of discrete plural particles which tend to agglomerate when wetted, the cohesiveness agent being present in an amount effective to enhance the intraparticle cohesion of the particles.

9. A method comprising:
providing an animal litter; and allowing an animal to excrete waste into said animal litter;
said animal litter comprising discrete plural particles of a sorbent material and a cat attractant, the cat attractant comprising a mixture of alfalfa meal and an acidic plant fiber, the alfalfa meal being present in an amount of at least 60% by weight relative to the weight of the acidic plant fiber.

10. A method according to claim 9, the litter comprising ground corn, defatted corn germ, citrus fiber, a lubricant, and a cohesiveness agent, the animal litter being in the form of discrete plural compacted particles which attend to agglomerate when wetted, said cohesiveness agent being present in said litter in an amount effected to enhance the intraparticle cohesion of said particles.

11. A method according to claim 9, said sorbent comprising at least 10% finely ground wood powder, said wood powder functioning as a sorbent in said litter, a lubricant, and a cohesiveness agent, the animal litter being in the form of discrete plural particles which tend to agglomerate when wetted, the cohesiveness agent being present in an amount effective to enhance the intra particle cohesion of the particles.

12. A method comprising:
providing an animal litter;
providing a cat attractant, the cat attractant comprising a mixture of alfalfa meal and an acidic plant fiber, the alfalfa meal being present in an amount of at least 60% by weight relative to the weight of the acidic plant fiber; and
adding said cat attractant to said litter in an amount effective to render said litter relatively more attractive for use by cats.

* * * * *